March 31, 1925.  1,532,056

F. H. KESKE

FOUNTAIN

Filed May 20, 1920   3 Sheets-Sheet 1

Witnesses:

Inventor,
Frederick H. Keske.
By
His Attorney.

March 31. 1925.

F. H. KESKE

FOUNTAIN

Filed May 20, 1920

1,532,056

3 Sheets-Sheet 2

Witnesses.
C. E. Thredy.
Thos. J. Donnelly

Inventor.
Frederick H. Keske
By Joshua R. H. Potts
His Attorney.

March 31, 1925.                                              1,532,056
F. H. KESKE
FOUNTAIN
Filed May 20, 1920          3 Sheets-Sheet 3

Witnesses.                                  Inventor.
                                            Frederick. H. Keske
                                            By Joshua R. H. Potts
                                              His Attorney.

Patented Mar. 31, 1925.

1,532,056

UNITED STATES PATENT OFFICE.

FREDERICK H. KESKE, OF CHICAGO, ILLINOIS.

FOUNTAIN.

Application filed May 20, 1920. Serial No. 382,813.

*To all whom it may concern:*

Be it known that I, FREDERICK H. KESKE, a citizen of the United States, and a resident of the city of Chicago, county of Cook, and State of Illinois, have invented certain new and useful Improvements in Fountains, of which the following is a specification.

My invention relates to new and useful improvements in fountains, and has for its object the provision of means for conveying liquid and electricity through the columns of the fountain. Another object is the provision of means in a fountain for illuminating the sprays of water. Another object is the provision of a fountain mounted upon a pedestal and providing said pedestal with supporting shelves.

Other objects will appear hereinafter.

The invention consists in the combinations and arrangements of parts hereinafter described and claimed.

Figure 1:
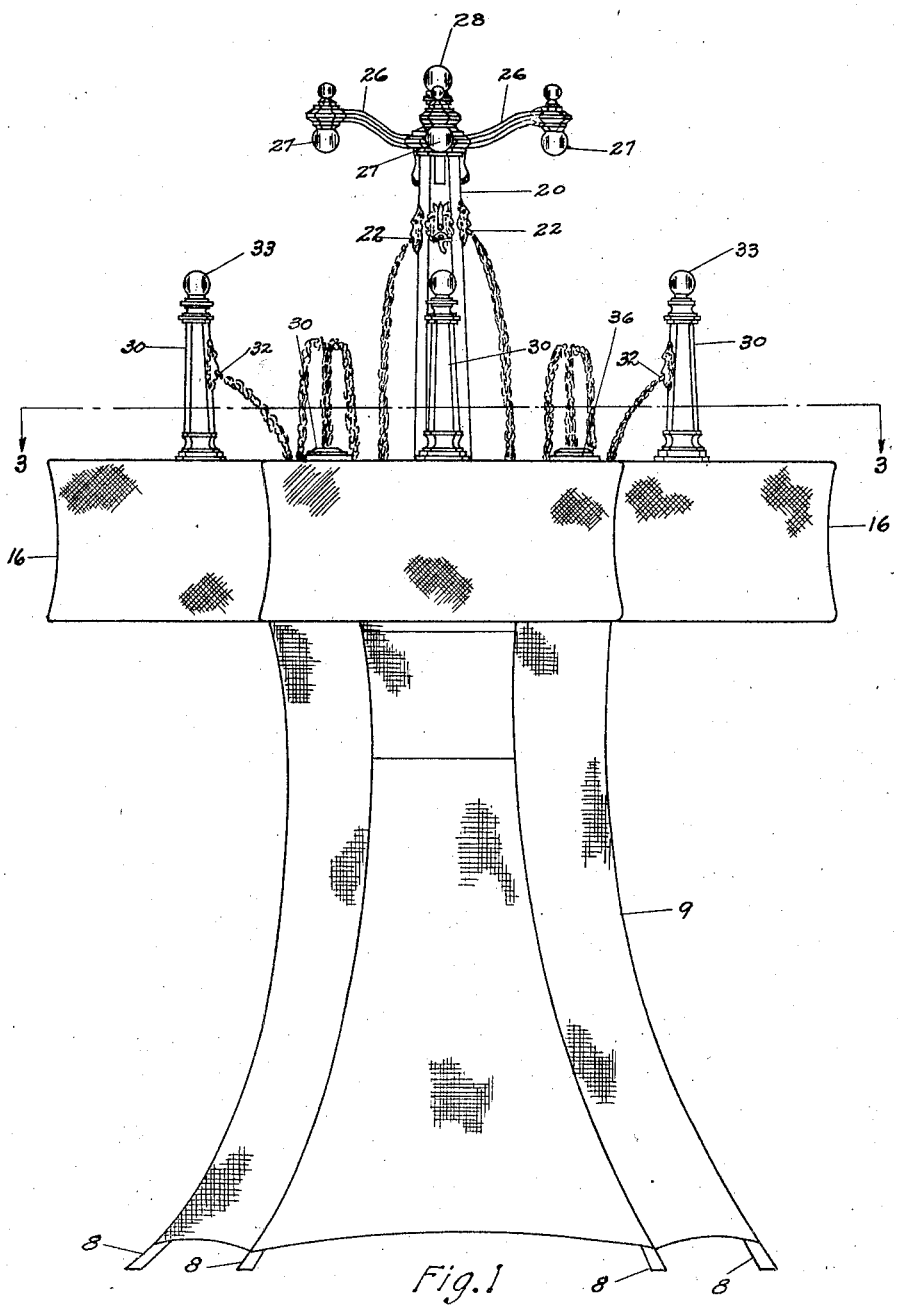
Figure 2:
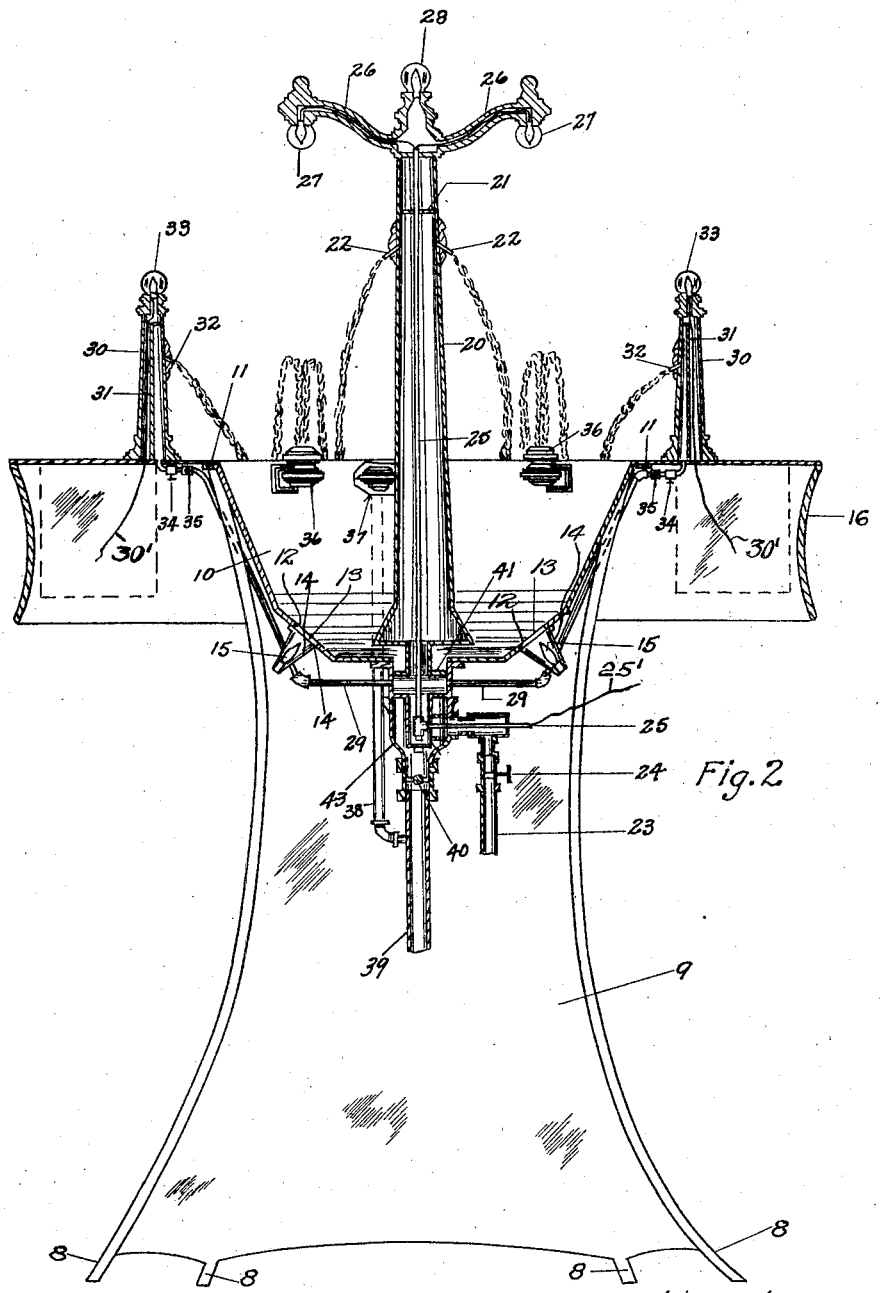
Figure 3:
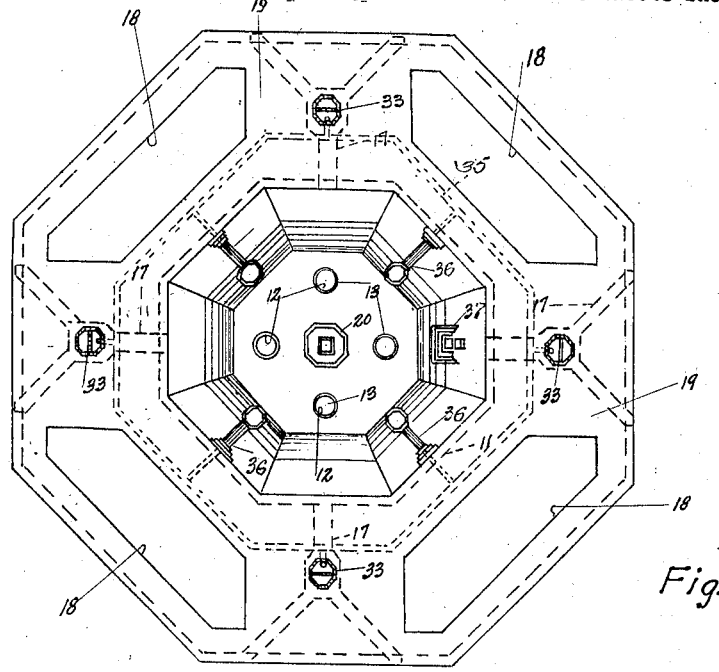
Figures 4, 5, 6:
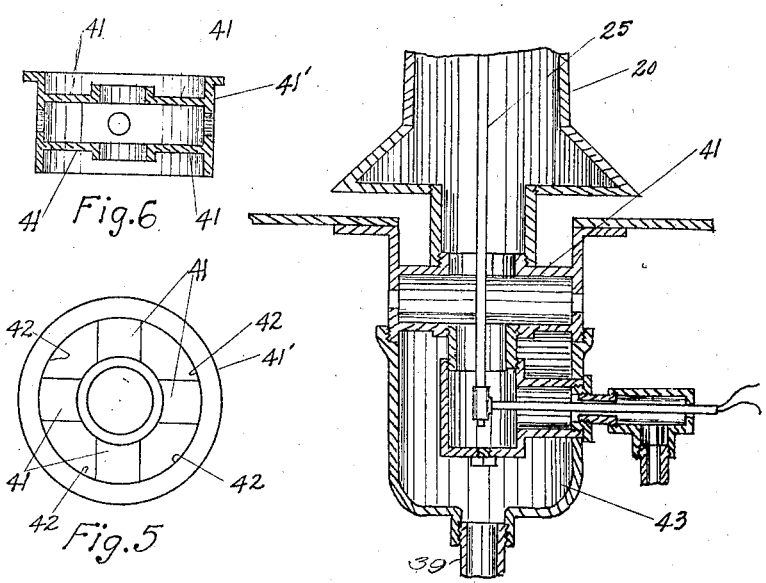

The invention will be best understood by reference to the accompanying drawings forming a part of this specification, and in which, Fig. 1, is a side elevational view of the invention, Fig. 2, a central vertical sectional view of the invention, Fig. 3, a sectional view taken on substantially line 3—3 of Fig. 1, Fig. 4, a vertical sectional view showing the connection of the bowl with the water supply and drain, Fig. 5, a top plan view showing the connecting collar used in the invention, and Fig. 6, a central vertical sectional view of the connecting collar used in the invention.

The preferred form of construction comprises a pedestal having legs 8, which are encased in a suitable wicker wrapping 9. Positioned within the legs 8, adjacent the upper end thereof, is a bowl 10 which has, extending horizontally at its upper edge, a flange 11 which engages the upper end of the legs 8. As shown in Fig. 2, the walls of the bowl 10 are inclined inwardly toward the base, and adjacent the extreme lower end thereof, this inclination is increased, and formed in this increasingly inclined portion are a plurality of openings 12, positioned upon which and serving as a closure therefor is a transparent member 13. Secured to the under surface of the bowl at this portion, is a socket 14 in which is mounted an electric lamp 15. The construction is such that when the bowl is filled with water and the light in the socket 14 lighted, the water will be illuminated. It is designed to form the members 13 of varicolored glass so that the light transmitted to the water will cause an illumination thereof in many colors. A collar 16 is provided, which is secured to the bowl at its upper edge by suitable Y-shaped members 17, which are rigidly attached to the flange 11 and rigidly attached to the member 16. The upper surface of the member 16 is provided at intervals with openings 18, in which a flower box may be inserted and supported thereby. The upper surface of the member 16 is formed from stained glass and serves as a shelf or support for articles which may be placed thereon.

Projecting through the base of the bowl 10 and extending upwardly therefrom is a central column 20, which is hollow and provided adjacent its upper end with a transversely extending partition 21. Provided around the periphery of the column 20, adjacent its upper end, are water spouts 22 inclined downwardly from said column and adapted to discharge water into the bowl 10, said water being delivered to the interior of the column 20 by a suitable pipe 23 which is connected to a suitable source of water supply. Positioned in the pipe 23, intermediate the water supply and the column 20, is a valve 24. Extending centrally through the column 20 is a pipe 25 designed to lead electric wires 25' to lights 27 provided upon cross arms 26, which are mounted on the column 20. A light 28 is also connected with this electric wire, and said light is positioned on the extreme upper end of said column. As shown in Fig. 2, the pipe 25 projects outwardly from the lower end of a cup-shaped member 43 and is designed for connection with a suitable source of electric power. Attached to the cup 43 and to the column 20 is an annular member 41' provided with intersecting branch members or conduits 41 forming passages extending therethrough at right angles to each other. These passages communicate with the feed pipe 23 and with branch pipes 29, which are designed to carry water into one compartment of a column 30, said column 30 being divided into a pair of compartments by an uprightly extending partition 31. Communicating with each of the water compartments of the member 30, and inclined downwardly toward the bowl 10 so as to be adapted for delivering water into said bowl, are spouts 32. In the other compartment of the column 30 electric wires 30' are strung to a light 33 positioned on the upper end of said column. As shown in Fig. 2, valves 34 are interposed in each of the pipes 29. A branch pipe 35 is attached to the pipes 29, and extends around the bowl beneath the surface of the member 16, and communicates with nozzles 36 which are mounted upon the inner surface of the bowl 10, as shown in Fig. 2. An outlet basin 37 is also mounted upon the inner surface of the bowl 10, adjacent its upper end, and communicates, by means of a suitable pipe 38, with a drain pipe 39. As shown in Figs. 5 and 6, an annular member 41' is provided between the branch members 41 with open spaces 42 which communicate with the bowl 10 and with the cup-shaped member 43. Therefore, it is evident that the bowl is in communication with the drain pipe 39 and this communication may be closed by means of a suitable valve 40, means thus being provided for the draining of the bowl. The member 37 serves merely as an overflow drain, as will be readily understood.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:—

1. A fountain including a pedestal comprising supporting members encased in a wicker wrapping, a basin mounted on the pedestal and having inclined side walls, and provided with a drain, a supporting shelf having an apron surrounding the basin, hollow columns on the supporting shelf, said columns being divided into compartments and having discharge openings communicating with certain of the compartments and electric conductors in other of said compartments, illuminating means carried by the columns and connected to said conductors, conduits in communication with said certain compartments adapted to deliver fluid to be discharged through the discharge openings, a conduit extending around the basin and in communication with the conduits, and spouts in communication with the conduit adapted to discharge fluid into said basin.

2. A fountain including a pedestal, a basin mounted on the pedestal and provided with a drain, a supporting shelf surrounding the basin, hollow columns on the supporting shelf, said columns being divided into compartments and having discharge openings communicating with certain of the compartments and electric conductors in other of said compartments, illuminating means carried by the columns and connected to said conductors, conduits in communication with said certain compartments adapted to deliver fluid to be discharged through the discharge openings, a conduit extending around the basin and in communication with the conduits, and spouts in communication with the conduit adapted to discharge fluid into said basin.

3. A fountain including a pedestal comprising supporting members encased in a wicker wrapping, a basin mounted on the pedestal and having inclined side walls, and provided with a drain, a supporting shelf having an apron surrounding the basin, hollow columns on the supporting shelf, said columns being divided into compartments and having discharge openings communicating with certain of the compartments and electric conductors in other of said compartments, illuminating means carried by the columns and connected to said conductors, conduits in communication with said certain compartments adapted to deliver fluid to be discharged through the discharge openings, a conduit extending around the basin and in communication with the conduits, spouts in communication with the conduit adapted to discharge fluid into said basin, a hollow column extending upwardly from said basin and provided with water spouts adjacent its upper end, and carrying illuminating means at the top thereof, and means adapted to supply fluid to said column to be discharged through the water spouts into the basin.

4. A fountain including a pedestal, a basin mounted on the pedestal and provided with a drain, a supporting shelf surrounding the basin, hollow columns on the supporting shelf, said columns being divided into compartments and having discharge openings communicating with certain of the compartments and electric conductors in other of said compartments, illuminating means carried by the columns and connected to said conductors, conduits in communication with certain compartments adapted to deliver fluid to be discharged through the discharge openings, a conduit extending around the basin and in communication with the conduits, spouts in communication with the conduit adapted to discharge fluid into said basin, a hollow column extending upwardly from said basin and provided with water spouts adjacent its upper end, and carrying illuminating means at the top thereof, and means adapted to supply fluid to said column to be discharged through the water spouts into the basin.

In testimony whereof I have signed my name to this specification in the presence of two subscribing witnesses.

FREDERICK H. KESKE.

Witnesses:
JOSHUA R. H. POTTS,
ROSE K. TRIB.